Patented Mar. 27, 1923.

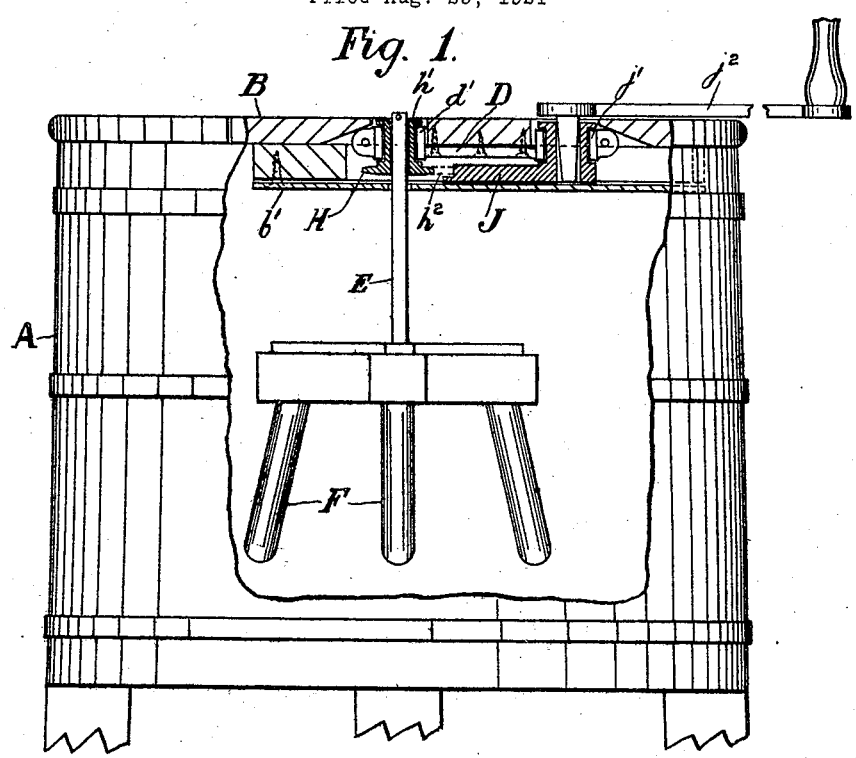
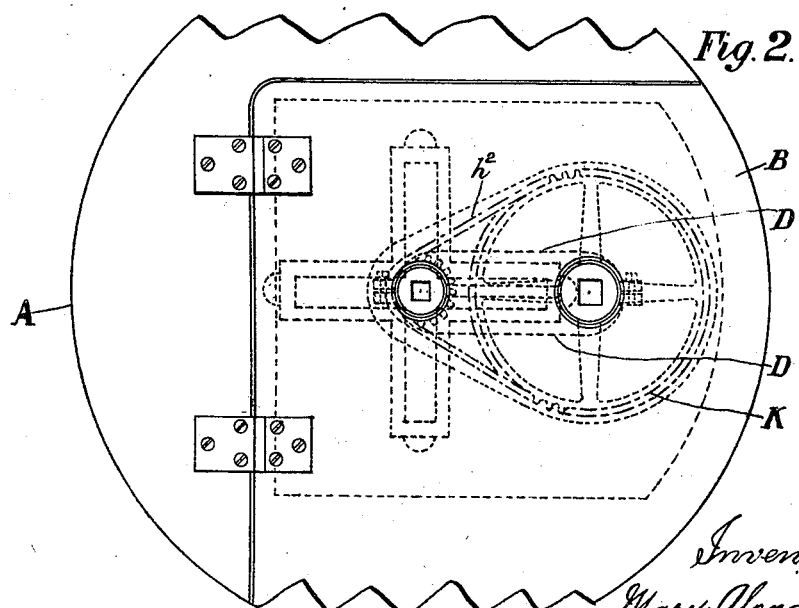

1,449,574

UNITED STATES PATENT OFFICE.

MARY ALEXANDER, OF HARROW, ENGLAND.

WASHING MACHINE.

Application filed August 23, 1921. Serial No. 494,490.

*To all whom it may concern:*

Be it known that I, MARY ALEXANDER, a subject of the King of Great Britain, residing at 70 Marlborough Hill, Harrow, in the county of Middlesex, England, have invented new and useful Improvements in Connection with Washing Machines, of which the following is a specification.

This invention has reference to machines or apparatus for washing clothes, and particularly refers to apparatus for attaching to the ordinary domestic washing tub, the object being to produce apparatus which is simple in construction, easy to operate, and inexpensive to manufacture.

The apparatus consists of a base, preferably of wood, which may be hinged to and form part of the top or cover of an ordinary washing tub. Fixed to this base is a bearing plate having a bearing arranged centrally over the tub in which a sprocket wheel is mounted formed with a central hole, preferably square. Suspended in this sprocket wheel is a shaft or spindle, preferably square, on the inner end of which a "dolly" or "peggy" is mounted, being either fixed or capable of moving up and down said shaft. A driving chain passes around the sprocket wheel the ends of which chain are fixed to a semi-circular wheel suspended in a bearing formed at the opposite end of the bearing plate. A hole, preferably square, is formed in the boss of the semi-circular wheel into which a right angle projection on the end of a lever fits, a handle being provided on the opposite end of said lever, also projecting at right angles thereto, but in the reverse direction.

The invention is illustrated on the accompanying drawings.

Fig. 1 is a broken part sectional view of a washing machine constructed according to this invention.

Fig. 2 is a broken plan view showing an endless chain drive.

A represents the tub, B the top or lid, D the bearing plate, $d^1$ the bearing or socket arranged centrally over the tub, E the shaft or spindle preferably square as shown, which is suspended and projects downwards into the tub, F the "dolly" or "peggy" mounted on the lower end of said shaft E, H the small sprocket wheel forming part of or fixed to the sleeve $h^1$ which fits on to the opposite end of the shaft or spindle E and into the socket or bearing $d^1$, $h^2$ the driving chain which passes around the sprocket wheel H, J the semi-circular wheel to which the ends of the chain $h^2$ are secured, $j^1$ the socket or bearing in which the wheel J is mounted near the edge of the tub and $j^2$ the lever which operates the semi-circular wheel J.

In the method shown by Fig. 1 where the mechanism is suspended on the inner side of the lid B, the bearing plate D is made in two parts to enable the sprocket wheel H and the semi-circular wheel J to be mounted in their respective bearings $d^1$ and $j^1$, all the parts being enclosed by the cover $b^1$.

It will thus be seen when the lever $j^2$ is moved to and fro in a horizontal plane, that motion will be imparted to the "dolly" or "peggy," thereby agitating or moving the clothes to and fro in the tub.

At Fig. 2 I have shown the driving mechanism located on the inner side of the lid B in a similar manner to that shown by Fig. 1, but in this case instead of mounting a semi-circular wheel J in the bearing $j^1$ I mount a sprocket wheel K and employ an endless driving chain $h^2$.

What I claim as my invention and desire to secure by Letters Patent is:—

In a driving mechanism for a washing machine, a horizontal lid adapted to close the wash tub and provided with an opening, a bearing plate formed in two halves arranged side by side and secured to the underside of the lid and provided with two bearings each of which is formed in halves, a sprocket wheel provided with a hub on its upper side which is suspended in one of the said bearings, an operating shaft suspended from the said hub, a driving wheel having a hub on its upper side which is suspended in the other bearing and which projects into the said opening in the lid and which is provided with a rectangular socket, a flexible driving connection engaging with the said sprocket wheel and driving wheel, and an operating handle provided with a rectangular projection for engaging with the said socket.

In testimony whereof I have signed my name to this specification in the presence of two subscribing witnesses.

MARY ALEXANDER.

Witnesses:
S. F. ALEXANDER,
H. W. DENTON INGHAM.